Oct. 16, 1928.

J. RICE 1,687,794

MOVABLE FLOOR FOR ELEVATOR CARS

Filed March 4, 1927

Inventor
Joseph Rice

Patented Oct. 16, 1928.

1,687,794

UNITED STATES PATENT OFFICE.

JOSEPH RICE, OF CHICAGO, ILLINOIS, ASSIGNOR TO ELEVATOR COMPANY OF AMERICA, OF CHICAGO, ILLINOIS, A CORPORATION OF ILLINOIS.

MOVABLE FLOOR FOR ELEVATOR CARS.

Application filed March 4, 1927. Serial No. 172,717.

My invention relates to movable floors for elevators and more particularly to means whereby such a floor may be utilized to effect a controlling influence over the car control mechanism.

My invention is particularly applicable to elevators of the type which are operated by the user. These elevators are generally the push button type whereby the operator of a push button corresponding to a floor of the building will automatically cause the car to move to that particular floor and stop. In apparatus of this kind, there is a door for the hatchway and also a door provided upon the car, and the control mechanism is so arranged that the user is unable to move the car unless both the hatch door and the car door are closed. The reason for providing this double door structure is to prevent accidents caused by leaving one of the doors open. It sometimes happens that when a user leaves the car, he forgets to close the door to the car but does close the hatchway door. In this case it would be impossible for any prospective user desiring to use the car to bring it to another floor as the car control apparatus is left inoperative because of the open car door.

To avoid this contingency, I provide a movable floor within the car which is so arranged that when one or more persons stand upon this floor, an electric switch mechanism which is in parallel when the switch mechanism of the car door is open, so that before a user within the car can operate it, it is necessary for both the car door and the hatch door to be closed. However, if the car is empty and standing at a floor, then the movable floor moves back into its circuit closing position so that the switch mechanism controlled by this floor and which is in parallel with the switch mechanism controlled by the car door will permit operation of the car from another floor so long as the hatch doors are closed. This makes it necessary in order for the car to operate that in all instances the hatch doors must be closed and in addition the car must either be unoccupied or the car door must be closed.

It is a purpose of my invention to provide a movable floor within the car for accomplishing the above results and in addition to provide means which will maintain the floor in the proper position when the car is empty and will permit a slight load to move the car floor into the position which requires the car door to be closed before the car can be moved.

One form which my invention may take is shown in the accompanying drawings wherein—

Figure 1:
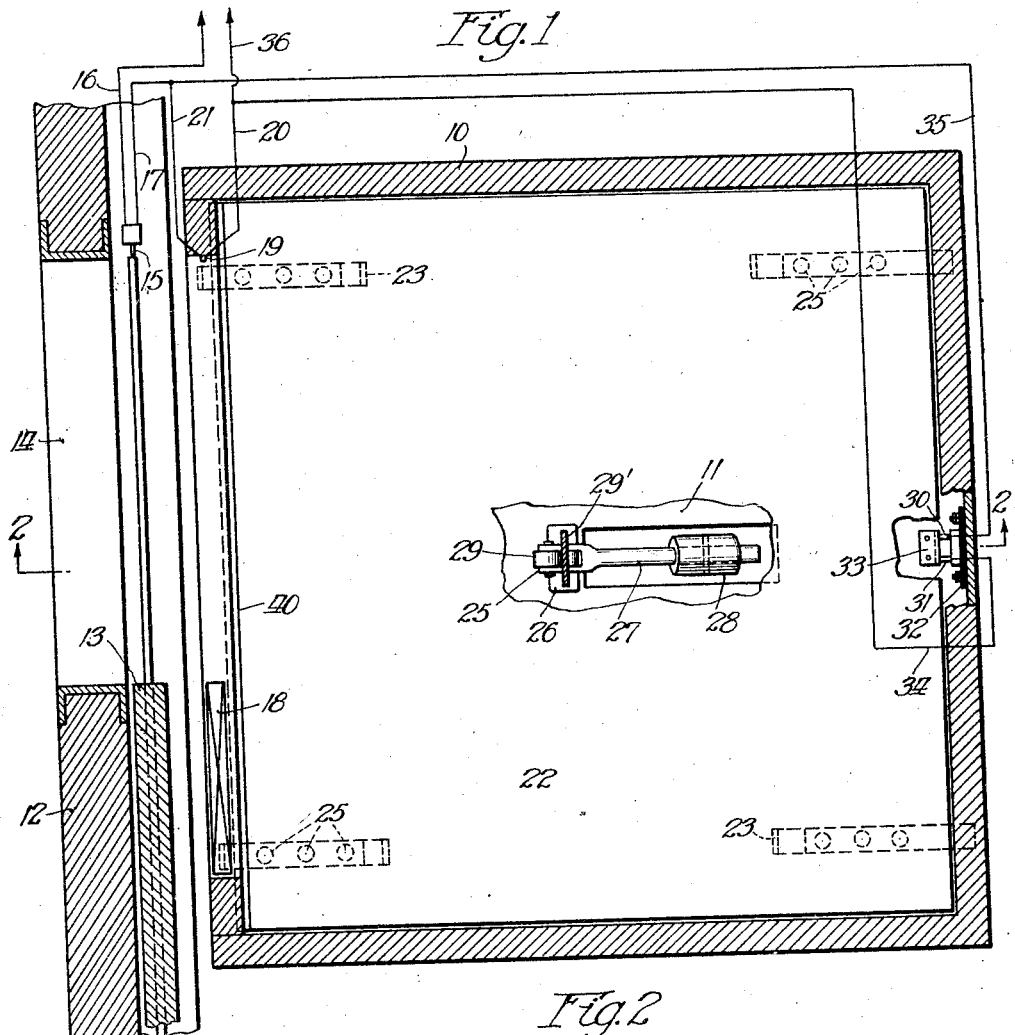
Figure 2:
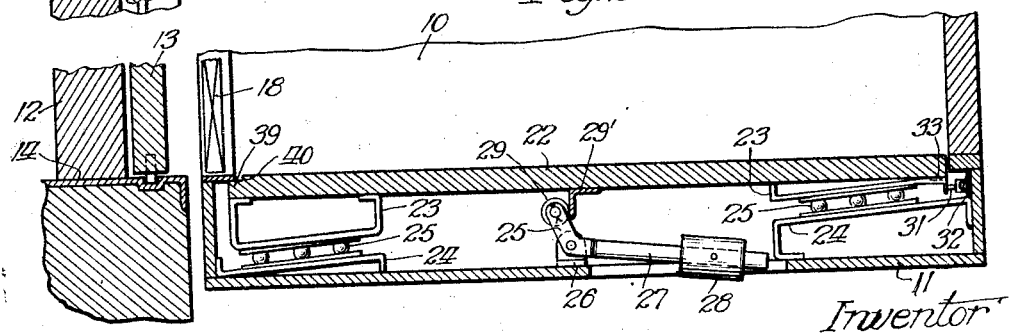

Fig. 1 is a top view of the car floor showing its relation to the car framework and the hatchway, certain portions of the floor being broken away to more clearly reveal features of construction; and Fig. 2 is a section on the line 2—2 of Fig. 1.

In accordance with my invention, I provide a car framework 10 consisting preferably of four sides, top and bottom, the bottom portion of the framework being shown at 11. The car is in a hatchway surrounded by the wall 12 and a hatch door 13 controls the entrance to the door opening 14. The hatch door 13 is designed to short circuit a pair of contacts, of which one the contact 15 is shown, whenever this hatch door is in its closed position. The closure of the circuit through the contact 15 closes the circuit through wires 16 and 17. The cooperation of these wires with other circuits will be presently explained.

The car also has a collapsible door 18 which is shown in its open position in Fig. 1 but which, when closed, is adapted to close circuit through a similar pair of contacts 19, one of which is shown opposite the door 18. The closure of this circuit across the contacts 19 completes the circuit through the wires 20 and 21 as will be hereinafter explained. Within the car there is provided a movable platform or floor 22, which movable platform at its lower portion preferably carries a plurality of inclined frames 23. These inclined frames are preferably arranged parallel to similarly inclined frames 24 provided on the car framework. Interposed between the two frameworks 23 and 24 are the balls 25 which form a bearing so that the frameworks 23 may roll over the frameworks 24. By this construction, it will be noted that if the weight is placed upon the platform 22, the platform will move downwardly and to the left as shown in Fig. 2. Such action of the platform will be against the pressure exerted by the lever 25. This lever is pivotally mounted upon the car framework as at 26 and has the horizontally extending portion 27 carrying the weight 28 which is sufficient when the car is empty to move the platform 22 to the right by exerting a horizontal force through the roller 29 and stop 29' upon the platform. When the platform is in the position shown in Fig. 1, a circuit is closed across two spring backed contacts 30 and 31 which are insulatingly mounted upon the car framework.

The construction and arrangement of the spring contacts 15 and 19 is similar to that disclosed for the contacts 30 and 31. The contacts 30 and 31 are insulatingly mounted in a support 32 secured to the car framework. The platform 22 carries a contact plate 33 which when in the position in Fig. 1, short circuits the fingers 30 and 31 so as to complete a circuit through the wires 34 and 35. Now, whenever a weight is placed upon the floor or platform 22, such as that of a light person, the platform 22 moves downwardly against the action of the lever 25 and opens the circuit through the contacts 30 and 31. The wires 34 and 35 as shown are connected in parallel with the wires 20 and 21. The conductor 17 is then connected to the conductors 21 and 35 and the conductor 16 extends away from the car and controls suitable mechanism which permits or prevents the operation of the car. A further conductor 36 which is connected to the conductors 20 and 34 extends in parallel with the conductor 16. The arrangement is such that the circuit across conductors 16 and 36 must be completed before the car can be operated and under these conditions a circuit must be completed through the spring contacts 15 and either through the spring contact 19 or the spring contacts 30 and 31 as was explained in the introductory part of the application.

A ledge 39 is provided upon the car floor which limits the movement of the car floor in response to the action of the lever 25. A similar ledge 40 at right angles to the ledge 39 also limits the downward movement of the floor when a weight is placed thereon.

From what has been described, it is thought that the nature of my invention will be clear to those skilled in the art and the advantages thereof will be readily apparent. It will also be apparent that modifications may be made from the exact details shown without departing from the spirit of the invention and I wish it to be understood that I intend to avail myself of all such modifications as come within the scope of the claims.

Having thus described one form which my invention may take, what I desire to claim and secure by Letters Patent of the United States is:

1. A car having a framework, a movable floor carried by said framework, car control mechanism responsive to the position of said floor, means for movably carrying said floor on said framework, said means including an inclined runway, a weighted lever pivoted to said framework and means on said floor cooperating with one end of said lever whereby the downward movement of said weighted lever tends to move said floor upwardly along said runway.

2. A car having a framework, a movable floor carried by said framework, car control mechanism responsive to the position of said floor, means for movably carrying said floor on said framework, said means including a plurality of parallel inclined runways, and a lever pivoted to said framework having one end weighted and the other end engaging said floor to urge said floor upwardly along said runways.

3. A car having a framework, a movable floor carried by said framework, car control mechanism responsive to the position of said floor, means for movably carrying said floor on said framework, said means including a plurality of inclined runways and means, comprising a stop on said floor and a lever pivoted to said framework having a roller at one end engaging said stop and a weight pressing said roller against said stop for urging said floor upwardly along said runways.

4. A car having a framework, a movable floor carried by said framework, car control mechanism responsive to the position of said floor, means for movably carrying said floor on said framework, said means including an inclined runway, a stop depending from said floor, a weighted lever pivoted to said framework and having one end engaging said stop for urging said floor upwardly along said runway.

In witness whereof, I hereunto subscribe my name this 14th day of February, A. D. 1927.

JOSEPH RICE.